Aug. 10, 1965  LE ROY E. HOLMSTROM  3,199,242
LINE SUPPLY DEVICE FOR FISHING POLE
Filed March 12, 1964
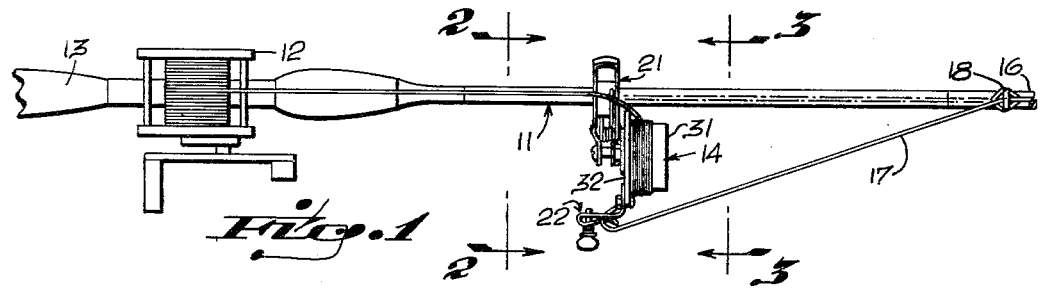
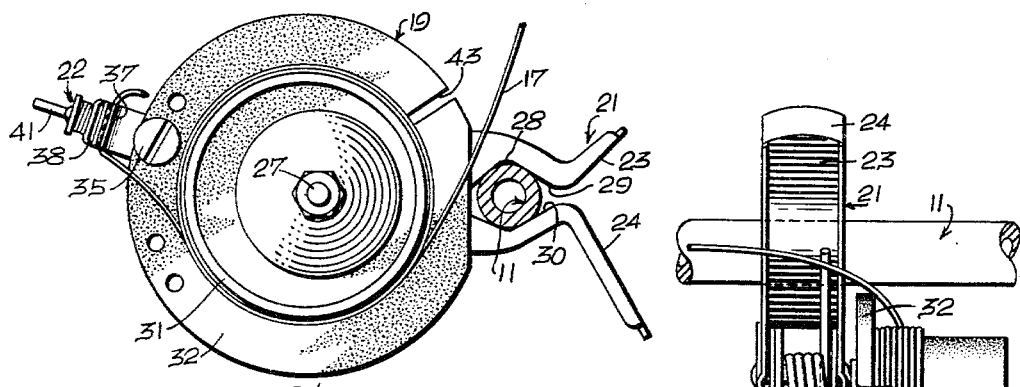
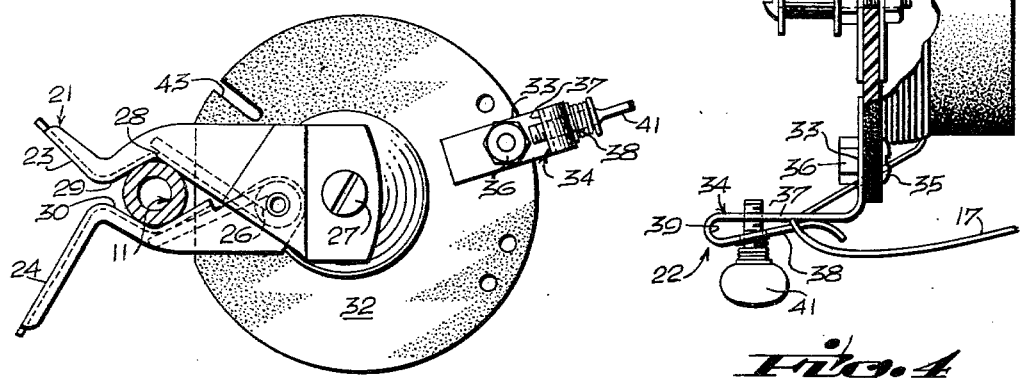
INVENTOR.
LEROY E. HOLMSTROM
BY *John Cyril Malloy*
ATTORNEY.

United States Patent Office 3,199,242
Patented Aug. 10, 1965

3,199,242
LINE SUPPLY DEVICE FOR FISHING POLE
Le Roy E. Holmstrom, 8251 NW. 172nd St., Miami, Fla.
Filed Mar. 12, 1964, Ser. No. 351,499
2 Claims. (Cl. 43—25)

This invention relates to a device which is adapted to be removeably attached to a fishing pole or rod for storing a supply of fishing line to be released when the bait is struck by a fish, such as a sailfish.

As is perhaps well known, there are certain types of fish, such as sailfish which, upon seeing a prey in the water, attack with a flash stunning the prey and then circling around and moving in for the kill once the fish feels certain that the prey has in fact been stunned. It has been found that, when a fish of the class described above strikes, and the bait which it has hit does not discontinue motion and lie relatively idle, the fish will reject the bait. In order to cause the bait to lie idle in the water after it has been hit, a fishing line is passed from the end of a fishing pole at the stern of a ship to a clip on an outrigger and thence to the water instead of being towed directly behind a boat. The clip on the outrigger member includes a means responsive to a tug on the line so that it will release the line supply, which is that length which extends out to the clip of the outrigger, with the result that the bait which is being dragged behind the boat will momentarily lie motionless in the water while the said length is slowly taken up by the boat's forward motion. During the interval of time while the slack length is being taken up, the fish circles the boat and, it is hoped, strikes again in the belief it has stunned the prey, this time swallowing the bait and becoming hooked. The further explanation of the prior art line supply release device is found in U.S. Patent No. 2,170,594.

Many smaller boats are not equipped with outriggers and, this invention provides an attachment for fishing poles to be used on such crafts which will include means for a releasable line supply, thereby permitting use of smaller, inexpensively equipped boats and fishing poles to be used in fishing for such game fish as sailfish and the like.

It is accordingly an object of this invention to provide a releasably mounted line supply housing for fishing poles having a line release clip which housing is adapted to be disposed intermediate the end of the pole nearest the baited hook and the handle of the pole having the reel.

It is another object of this invention to provide a device of the type described hereinafter, which is strong and durable, simple and inexpensive to manufacture, and of practical construction, which is otherwise well adapted for the purposes for which it is intended.

In accordance with these and other objects herein, the instant invention will now be described with reference to the accompanying drawings which illustrate a preferred embodiment thereof.

In the drawings:

FIG. 1 is a plan view of a fishing pole provided with the instant invention.

FIG. 2 is a cross sectional view taken along the line 2—2 and looking in the direction of the arrows.

FIG. 3 is a cross sectional view taken along the line 3—3 and looking in the direction of the arrows of FIG. 1.

FIG. 4 is a partial plan view, partly broken away and in cross section, for illustrating purposes.

Referring more particularly to the drawings, wherein like reference characters designate like or corresponding parts throughout the different views, and referring particularly to FIG. 1, the numeral 11 represents a fishing pole having a reel 12 fastened adjacent the handle 13 and having the instant line supply device 14 fastened to the pole intermediate the handle 13 and the end of the pole designated by the numeral 16. The line 17 is ordinarily cast or otherwise fed from the reel 12 toward the end 16 of the pole 11 and is supported along the length of the pole by a series of rings such as 18. The line supply device 14 comprises a line supply housing 19 with a releasable fastening means 21 for attaching it to the pole, and a line release clip 22 to be described. The releasable fastening means 21 comprises a pair of opposed ears 23 and 24 which are biased in a closed position by a coil spring 26. As shown in FIG. 4 the ears are adapted to be pivoted with respect to a center pin 27 for opening and receiving the pole in the seat 28 defined by dog legged portions of the ears, 29 and 30. The line supply housing includes a cylinder 31 and a back up plate 32 at one end which is of a larger diameter than that of the cylinder. At a point 33 adjacent to the outer periphery of the back up plate 32, the line release clip 22 is mounted; and, as best shown in FIG. 4, it comprises a spring steel clip 34, which is fastened to the plate at the point 33 by means of a screw 35, bolt 36, and includes a first leg 37 and a second leg 38 with a bite 39 therebetween. A screw 41 is provided to adjust the tension of the first leg 37 and the second leg 38 when they are in overlaying relationship closing the loop defined therebetween.

In use, a supply of the line is threaded from the reel, going toward the baited hook, over the foot, or through a suitable guide means which may be provided in the foot such as a slot similar to that designated by the numeral 43 at any substantial point on the periphery, and wound around the cylinder 31. From the cylinder 31, the line is lead to the loop of the clip 22 and to the rings 18. When a fish strikes initially with sufficient force, the line is pulled from the clip 22 as the oppressed forces of the first and second legs 37 and 38 are overcome with the result that the supply of line wound on the cylinder is dropped into the water causing slack to be taken up as the boat travels forward at a relatively slow speed and the bait lies relatively motionless in the water as the fish circles it for the next strike.

While the instant invention has been shown and described herein in what is conceived to be the most practical and preferred embodiment, it is recognized that departures may be made therefrom within the scope of the invention, which is therefore not to be limited to the details disclosed herein but is to be accorded the full scope of the claims so as to embrace any and all equivalent apparatus and articles.

What is claimed is:

1. A line supply device for attachment intermediate the length of the fishing pole to releasably hold a slack length of fishing line intermediate a reel mounted adjacent the rearward end of the pole and the other end of said pole comprising; a cylindrical line supply housing having a smooth exterior surface to receive a slack length of line in peripheral windings over the axial length thereof; clamp means on the housing to releasably attach the line supply to a fishing pole and to hold the axis of the housing substantially parallel to the center line of the pole adjacent the reel; a foot portion of greater diameter than the main body of the housing on the rearward end of said housing; clip means mounted on the foot to releasably trap the slack length of a line on the housing, said clip means having a mounting leg secured to said foot portion in a region remote from said clamp means, the said clip means opening forwardly, responsive to a sudden tension force on the line greater than the normal drag forces caused by a hook dragged in the water and connected to the line, and effective to release the line from the clip means so that a slack length of line on the housing is free to drop readily into the water, said clip means including a normally closed, reversely-bent leaf spring extending generally perpendicular to said foot portion and defining a bite through which the hook end of the slack length is passed; and adjusting means to adjust the tension of the clip means.

2. A line supply device as set forth in claim 1 wherein the said adjusting means comprises a screw spanning the bite of the clip means and effective to draw the bite together to increase the tension required on the line in order to pull the hook end of the slack length out of the bite of the clip means.

References Cited by the Examiner
UNITED STATES PATENTS

| | | | |
|---|---|---|---|
| 2,605,570 | 8/52 | Abrey | 43—25 |
| 2,691,840 | 10/54 | Smith | 43—25.2 |
| 2,731,756 | 1/56 | Nelson | 43—20 |
| 2,893,156 | 7/59 | Warren | 43—17 |
| 3,010,673 | 11/61 | Marconi | 43—43.11 X |

SAMUEL KOREN, Primary Examiner.

ABRAHAM G. STONE, Examiner.